April 17, 1962   P. LIESENFELD   3,029,913
ADJUSTABLE TRUSSES
Filed Oct. 12, 1960   4 Sheets-Sheet 1
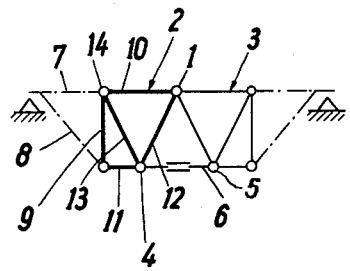
Fig. 1
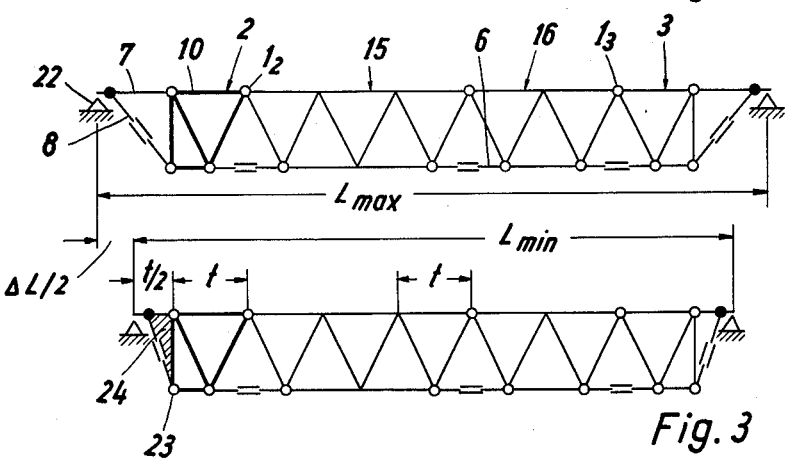
Fig. 2
Fig. 3
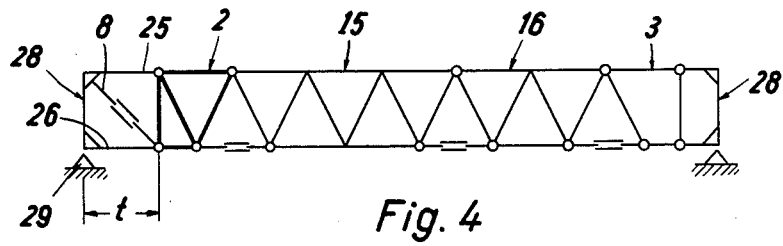
Fig. 4

April 17, 1962 P. LIESENFELD 3,029,913
ADJUSTABLE TRUSSES
Filed Oct. 12, 1960 4 Sheets-Sheet 4
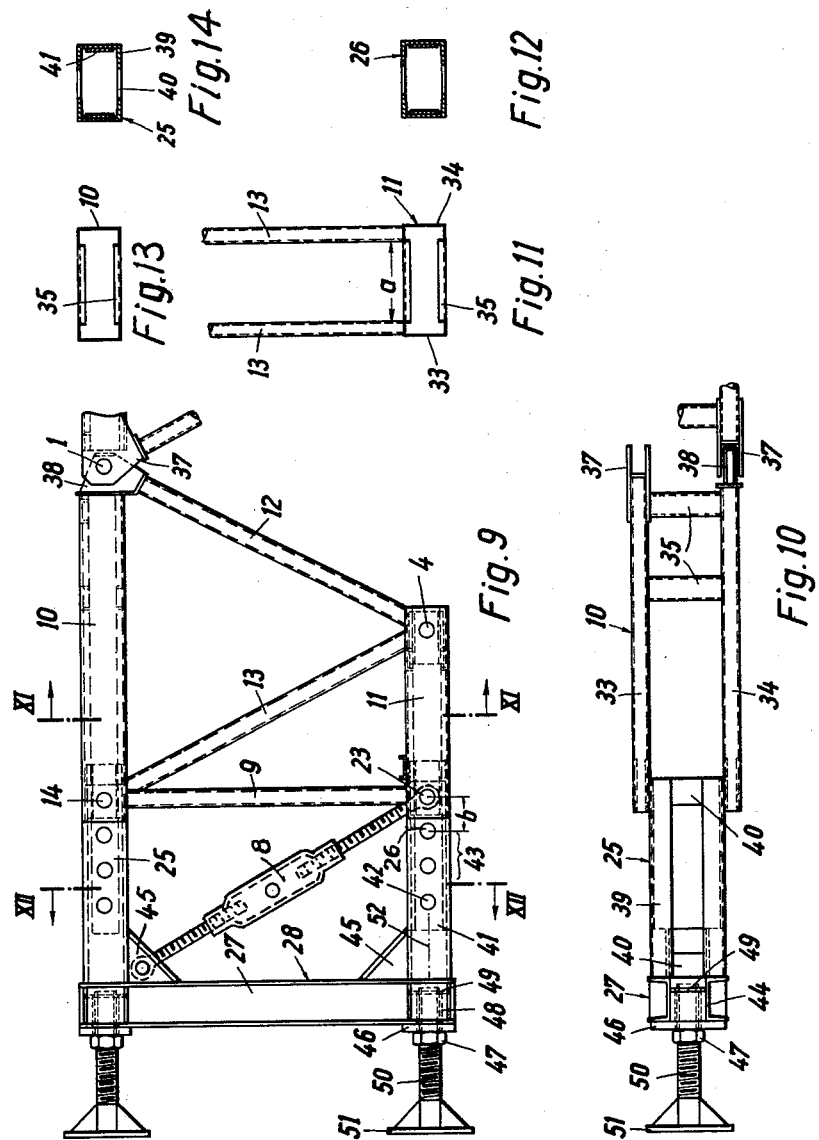

1

3,029,913
ADJUSTABLE TRUSSES
Peter Liesenfeld, Himmelgeister Str. 282, Dusseldorf, Germany
Filed Oct. 12, 1960, Ser. No. 62,302
Claims priority, application Germany Oct. 15, 1959
6 Claims. (Cl. 189—37)

The present invention relates to trusses.

With conventional elongated truss arrangements a plurality of truss units are assembled together and it is necessary to insert between the several units separate members which maintain the units in the desired relation with respect to each other, and it is also necessary to connect separate members to the ends of the truss to connect the truss to the elements which support the same or which are to be supported therby, and considerable difficulties are involved in connecting these separate members at the ends of the truss as well as to other parts thereof. Not only are there the difficulties involved with the connection of such separate members, but in addition these separate members detract from the strength of the truss.

It is a primary object of the present invention to provide a truss arrangement of the above type with end units in particular which include a minimum number of separate members of the type referred to above and which at the same time are very strong and can easily be connected to any desired point.

Another object of the present invention is to provide an end truss unit whose length will correspond to the length of other units of the truss and which at the same time can be adjustably connected with extensions enabling the entire truss to be connected in any desired way to connecting locations.

Still another object of the present invention is to provide a truss which very efficiently absorbs forces which act in the longitudinal direction of the truss so that the truss not only is capable of being used in a generally horizontal attitude, but also may be positioned vertically in order to form a vertical framework.

It is also an object of the present invention to provide for a truss of the above type a structure capable of adjustably varying the length of the truss at the ends thereof in both a coarse as well as fine manner.

With the above objects in view the invention includes in a truss, an end unit composed of a transverse end beam and a pair of longitudinal beams respectively fixed to the ends of the transverse beam and extending longitudinally therefrom in only one direction from the transverse beam, these longitudinal beams having different lengths with the longer of the beams having a length corresponding to the total length of the end unit as well as the length of the several units of the entire truss. The longer longitudinal beam is twice as long as the shorter longitudinal beam, and the end units of the invention includes a pair of oppositely inclined tie beams both fixed to the free end of the shorter longitudinal beam which is distant from the transverse beam, these tie beams also being respectively fixed to the opposite ends of the longer longitudinal beam. Each of the longitudinal beams has a pair of opposed side walls defining a space between themselves, and at least one extension beam is adapted to extend into the space between the side walls of one of the longitudinal beams. A means is provided for adjustably fixing the extension beam to the said one longitudinal beam over a range equal to the length of the shorter longitudinal beam.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a diagrammatic illustration of a truss including a pair of the end units of the invention;

FIG. 2 is a diagrammatic illustration of a longer truss which includes units in addition to those shown in FIG. 1;

FIG. 3 shows a truss similar to that of FIG. 2 with different construction at the ends of the truss;

Figure 5:
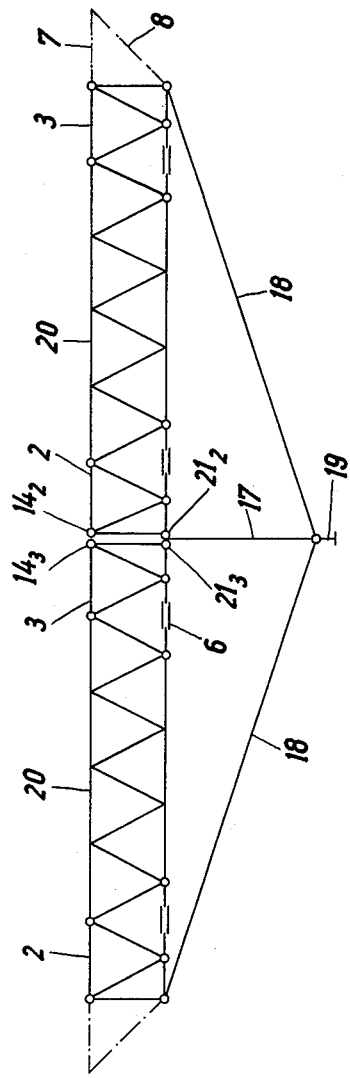
Figures 6, 7, 8:
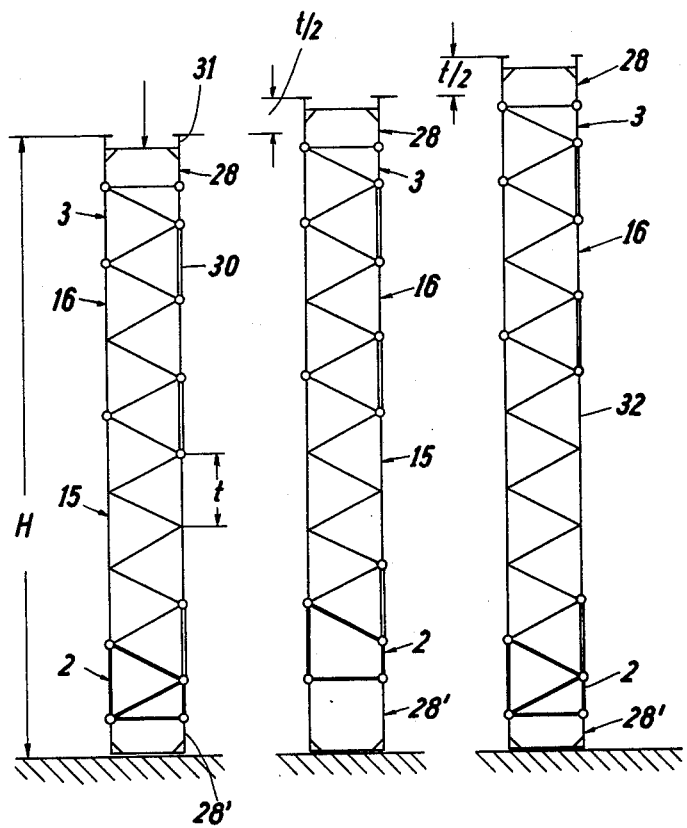

FIG. 4 also shows a truss arrangement similar to that of FIG. 2 but with different structures at the ends of the truss;

FIG. 5 is a diagrammatic illustration of yet another embodiment of a truss according to the present invention;

FIG. 6 illustrates how a truss of the invention may be vertically arranged;

FIG. 7 shows the truss of FIG. 6 modified so as to have a greater height;

FIG. 8 shows the truss of FIG. 6 further modified so as to have a height greater than that of FIG. 7;

FIG. 9 is an elevation of an end unit of the invention together with an extension thereof;

FIG. 10 is a top plan view of the structure of FIG. 9;

FIG. 11 is a fragmentary transverse section taken along line XI—XI of the lower part of FIG. 9 in the direction of the arrows;

FIG. 12 is a fragmentary transverse sectional view taken along line XII—XII of the lower part of FIG. 9 in the direction of the arrows;

FIG. 13 is a fragmentary transverse sectional view taken along line XI—XI of the upper part of FIG. 9 in the direction of the arrows; and FIG. 14 is a fragmentary transverse sectional view taken along line XII—XII of the upper part of FIG. 9 in the direction of the arrows.

Referring now to FIG. 1, there is shown therein a pair of units 2 and 3 having the structure of the present invention and connected with each other at the connecting point 1. The unit 3 is identical with the unit 2 but has been turned through 180° so that in FIG. 1 the units 2 and 3 appear as mirror-images of each other. The units 2 and 3 when connected to each other at the connecting point 1 form a space beneath the connecting point 1, since there is no interconnection between the points 4 and 5 of the units 2 and 3 when they are initially interconnected at the point 1, and in order to interconnect the units 2 and 3 at their points 4 and 5, a beam 6 is introduced between the points 4 and 5 and connected at its ends respectively to the points 4 and 5. This beam 6 is of an adjustable length. For example, the beam 6 may be in the form of a pair of beam portions interconnected at their adjacent ends by a turnbuckle arrangement so that it is possible to adjust the length of the beam 6 in order to accommodate it to the distance between the points 4 and 5. The adjustable beam 6 enables also the truss to be properly positioned for supporting a concrete mold in order to take into account the draft of the latter. The units 2 and 3 are provided at their upper ends with the extension beams 7 as well as with an additional beam 8 of adjustable length so that the truss may be connected to the supporting points diagrammatically shown at the ends of FIG. 1. The beams 8 are in the form of tie beams each provided with a turnbuckle or the like which forms a means for varying the length of the tie beams, and the extension beams 7 form extensions of the units 2 and 3 in a manner described below.

Each of the units 2 and 3 of the present invention is made up of five beams. Thus, each unit includes an end transverse beam 9 and a pair of longitudinal beams 10 and 11 respectively fixed to the ends of the transverse end beam 9 and extending in only one direction from the latter. The longer longitudinal beam 10 has a length $t$ which is equal to the length of each of the several units which are combined to make up a truss such as that shown in FIG. 3. The shorter longitudinal beam 11 has one half the length of the beam 10, and the remaining two beams of each of the units of the invention is made up of a pair of oppositely inclined tie beams 12 and 13 both of which are connected to the free end of the shorter longitudinal beam 11 which is distant from the transverse beam 9, and these oppositely inclined tie beams 12 and 13 are respectively fixed to the ends of the longer longitudinal beam 10. Thus, the three beams 11–13 are connected to each other at the connection 4, while the free ends of the tie beams 12 and 13 are connected to the longer longitudinal beam 10 at the connections 1 and 14, the three beams 9, 10 and 13 being connected to each other at the connection 14. At the places where the five beams 9–13 join each other, these beams are welded together so as to form a rigid network, and the connections where additional beams are connected to each of the units are formed by openings adapted to receive connecting pins.

In order to form a truss of substantial length, as indicated in FIG. 2, the end truss units 2 and 3 are spaced from each other and between these units are located a pair of truss assemblies 15 and 16. The assembly 15 is made up of three basic triangular units each having a length $t$, while the assembly 16 is made up of two such basic units, so that the assembly 16 is one unit shorter than the assembly 15. It will be noted that each of the units 15 and 16 is longer at its upper edge that at its lower edge by a distance $t$, and when the assemblies 15 and 16 are joined to each other as well as with the end units 2 and 3 of the invention, the tie beams 6 of adjustable length are interposed between the assemblies 15 and 16 along the lower edge thereof as well as between these assemblies and the end units 2 and 3, in the manner indicated in FIG. 2. The assembly 15 is connected at $1_2$ to the end unit 2 of the invention, while the assembly 16 is connected at $1_3$ to the end unit 3. The extension beams 7 extending from the longitudinal beams 10 of the pair of end units 2 and 3 of FIG. 2 as well as the tie beams 8 are the same as those described above in connection with FIG. 1.

With the even longer truss arrangement illustrated in FIG. 5, a strengthening framework is included, this strengthening framework including the column 17 and a pair of tension beams 18. A screw 19 is indicated diagrammatically in FIG. 5 connected with the beam 17 and beams 18 for interconnecting all of these elements. The truss itself is made up of a pair of assemblies 2, 20, 3, each of these assemblies having the end units 2 and 3 of the invention as described above, and each of these assemblies has a relatively long unit 20 connected between the end units 2 and 3, and the beams 6 of adjustable length are interposed between both ends of the unit 20 and the pair of end units 2 and 3 of each assembly, in the manner shown in FIG. 5. The extension beams 7 and tie beams 8 are also identical with those described above. The points $14_2$ and $14_3$ do not overlap. They are interconnected by an extension beam which interconnects the upper horizontal beams of the pair of adjoining end units 2 and 3 of FIG. 5. In the same way, the points $21_2$ and $21_3$ of FIG. 5 are not directly next to each other. They are interconnected by a lower extension beam, and this latter lower extension beam is fixed with the column 17 as by being welded to the top end thereof.

The truss of FIG. 2 has its maximum length since the upper extension beams 7 at both ends extend from the upper beams 10 of the units 2 and 3 by such a distance that the supporting points 22 are located from the units 2 and 3 by a distance equal to the distance $t$ of each of the units of the entire truss. FIG. 3 shows the smallest length of the adjustable truss of FIG. 2. Thus, as will be apparent from the description below, the range of adjustment of the extension beams such as the extension beam 7 is equal to one-half the distance $t$, so that the extension beam 7 can be adjusted to provide instead of the maximum length $L_{max}$ indicated in FIG. 2, the minimum length $L_{min}$, indicated in FIG. 3. Thus, when the extension beam 7 extends to the smallest extent beyond the units 2 and 3, the length of the truss beyond these units will be equal to $t/2$, and thus the minimum length shown in FIG. 3 is provided. In the event it is desired to increase the length of the truss beyond the maximum length indicated in FIG. 2, then it is only necessary, for example, to replace the unit 16 which has a length of $2t$, as was pointed out above, with a unit 15 which has a length $3t$, so that the truss would then include a pair of units 15 connected to each other and located between the end units 2 and 3. On the other hand, if it is desired to reduce the length of the truss beyond that indicated in FIG. 3, then it is only necessary to replace the unit 15 with a unit 16. Thus, it is possible with the above-described arrangement to provide a truss of any desired total length. This result is achieved not only by the interchangeable units 15 and 16, but also by the extension 7 of the units 2 and 3, these extensions 7 being adjustable over a range equal to one-half the length $t$ of each unit. It will be noted that the connection of the adjustable tie beam 8 at the point 23 indicated in FIG. 3 provides with the transverse beam 9 and the extension beam 7 the triangle 24 which gives a very favorable truss from a static standpoint inasmuch as the angle at the point 23 is quite small. It is also possible, as will be apparent from the description below, to provide a second extension at the lower beam 11 and to interconnect in this case the upper and lower horizontal extensions by a vertical or transverse beam.

Thus, where the truss rests on supports 29 in the manner shown in FIG. 4, the pair of extension beams 25 and 26 are provided at each end unit 2 and 3, these extension beams 25 and 26 being connected at their free ends distant from the end unit by a vertical beam 27 which together with the extension beams 25 and 26 forms the extension unit 28. Thus, each extension unit 28 is of a substantially horizontal U-shaped configuration, and the maximum length of the extension is the distance $t$ indicated at the left in FIG. 4. The horizontal extension beams 25 and 26 are horizontally adjustable with respect to the upper and lower beams of each unit 2 and 3 through a range equal to $t/2$, so that with the extension units 28 it is also possible to provide the same flexibility in the total length of the truss as was pointed out above in connection with FIGS. 2 and 3. The unit 28 at the right in FIG. 4 is shown extending to the minimum distance to the right beyond the end unit 3, and these units 28 are adjustable between the minimum distance shown at the right in FIG. 4 and the maximum distance shown at the left in FIG. 4. In the event that the unit 28 extends to its maximum distance beyond the end unit, as shown at the left of FIG. 4, an additional tie beam 8 which is adjustable in length through a turnbuckle arrangement or the like, as mentioned above, may be located diagonally in the extension unit in the manner indicated in FIG. 4. Of course, if the extension beam 26 is made of sufficient strength, the supporting point 29 need not be located at the outer end of the extension beam 26 but may engage the latter at any point along its length located beyond the end unit.

Where extension units 28 are used, the entire truss may be set up vertically, as indicated in FIG. 6. The truss of FIG. 6 is the same as that of FIG. 4, except that instead of tie beams 6 which are of adjustable length, tie beams 30 of a fixed length are introduced into the truss in the manner indicated in FIG. 6. Moreover, the extension unit 28 at the upper end of the truss is provided with a pair of screw means 31 forming threaded spindles which can be turned so as to extend to a desired distance upwardly beyond the upper unit 28, and thus the total length H of the assembly can be adjusted in this way. As will be apparent from the description below, the extension unit 28 is capable of being adjustably connected with the end unit such as the end unit 3 by selectively aligning one of a series of openings with an opening of the unit 3, and the openings of the series of openings are spaced from each other by a distance approximately equal to the maximum distance through which it is possible to turn each of the screws 31, so that in this way any desired length may be provided for the entire assembly. Of course, screws 31 may be provided at the lower extension units 28', or these screws may be located at both ends of the truss. The upper transverse beam 27 of each extension unit 28 may, if desired, be built up with such a strength that the load instead of being supported on a pair of screw spindles 31 can be carried directly by the uppermost beam 27 in the manner indicated by the arrow at the upper part of FIG. 6, so that the entire load can be concentrated at substantially one point with such an arrangement.

With a series of openings as described above, selection of one of these openings will provide a coarse adjustment of the height H of the truss, while turning of the spindles 31 will provide a fine adjustment, and with this arrangement also it is possible to vary the length of the entire assembly by increments of $t/2$. Thus, it will be seen that the truss of FIG. 7 is higher than that of FIG. 6 by the distance $t/2$, and this result has been obtained by extending the lower extension uint 28' from the minimum extension distance of FIG. 6 to the maximum extension distance of FIG. 7. In order to provide a height $H+t$, the upper unit 28 may be moved out to provide the maximum extension. Then the height indicated in FIG. 8 will be obtained. However, this same result can be achieved by using an assembly 15 having four basic units to provide a length $4t$, rather than the illustrated 3 unit length providing a length of $3t$, or also the same result may be achieved by replacing the unit 16 of FIG. 3 with a second unit 15, as was described above.

Where the trusses are used for concrete scaffolding, each basic unit of the truss has a length $t$ equal to 750 mm.

The structure of an end unit and extension unit of the invention is illustrated in detail in FIGS. 9–12. Thus, it will be seen from FIGS. 9–12 that each of the horizontal longitudinal beams 10 and 11 is made up of a pair of horizontal beams 33 and 34 spaced from each other and fixed to each other by a series of spaced elements 35. The beams 33 and 34 are of substantially C-shaped cross section, and the interconnection of the C-beams with the elements 35 provides each of the beams 10 and 11 with a hollow interior space located between the opposed side walls evident in FIG. 11. The transverse beam 9 is formed by a pair of tubular elements respectively fixed to the pair of beams 33 and the pair of beams 34 of the upper and lower beams 10 and 11 as by being welded thereto, and the beams 12 and 13 are also each in the form of a pair of tubular elements, as is particularly apparent from FIG. 11. The pair of tubular elements of the beam 9, 13 and 12 which are welded to the pair of C-beams 33 are located in a common plane, in the same way the tubular elements 9, 13 and 12 connected as by welding to the beams 34 are also located in a common plane. Actually, as is evident from FIG. 9, the upper ends of the tubular members 12 are welded to a plate 36 which is in turn welded to the right free end of the beam 10. The walls of each of the C-beams 33 and 34 have a thickness of 3 mm., for example, and the elements 35 have a length $a$, as indicated in FIG. 11, so that the pair of C-beams 33 and 34 are spaced from each other by the distance $a$.

The elements 33 and 34 are formed with the openings 4, 14, and 23 adapted to receive unillustrated connecting pins for interconnecting the several units, and these connecting pins are simply in the form of cylindrical members located in and passing through the aligned openings of the units and secured in any suitable way against falling out. The opening 1 is formed in an element 38 fixed to the C-beam 34 of the longitudinal beam 10, and this opening 1 is also formed in the bifurcated element 37 which is fixed to the C-beam 33 of the beam 10, all of these openings being aligned. The unit which is joined to the end unit shown in FIGS. 9 and 10 also has elements 37 and 38 formed with aligned openings, but these elements are reversed so that the pair of elements 37 respectively receive the pair of elements 38 to form a connection in the nature of a tongue and groove connection, and the connecting pins pass through the aligned openings. At the places where the openings 4, 14 and 23 are located, the side walls of the C-beams have additional plates welded thereto in order to strengthen the C-beams at the places where the openings 14, 4 and 23 are provided. These plates which are welded to the inner surfaces of the C-beams also serve to transmit the stresses of the bolts or connecting pins to the beams themselves.

The extension beams 25 and 26 are slidable in the spaces between the opposed side walls of each of the beams 10 and 11, and as is apparent from FIG. 12 each of the extension beams 25 and 26 is composed of a pair of channel beams 39 spaced from each other by elements 40 which are fixed to the free edges of the channel beams 39. The distance between the exterior side surfaces of each beam 25 and 26 is such that each of these beams is slidable in the space between the side walls of each of the longitudinal beams 10 and 11, respectively. Each of the side walls of each extension beam 25 and 26 has welded to its interior surface a strengthening plate 41, and this plate 41 as well as each side wall is formed with four openings 42 forming a row of openings spaced from each other by the distance $b$ shown in FIG. 9, and this latter distance is equal to $t/8$, so that the range of adjustment provided by the row of four openings 42 is equal to $t/2$, as was pointed out above. The adjustments are made simply by aligning the openings 42 with the openings 14 in the case of the extension 25 and with the openings 23 in the case of the extension 26, and of course the connecting pins are then inserted through the aligned openings, so that in this way the extension 28 is fixed to the end unit extending at a preselected distance therefrom. The above-described screw spindles 31 take the form of the screw members 50 which in the manner described below are turnable through a range equal to the distance $b$, so that in this way the coarse and fine adjustments are provided. The row of openings providing the adjusting means for adjustably interconnecting the extension beams with the longitudinal beams is indicated at 43. The transverse beam 27 which interconnects the extension beams 25 and 26 at their free ends is in the form of a pair of channel beams 44 which have their transverse webs directed toward each other as is apparent from FIG. 10, and plates 46 are welded to the pair of channel beams 44 adjacent the ends thereof in the manner shown in FIGS. 9 and 10. In addition, triangular plates 45 may be arranged at each junction of a pair of beams 39 and 44 for strengthening the unit 28.

In the event that the unit 28 in itself is not stiff enough, a tie beam 8 as described above may be added, and the position of such a tie beam shown at the left in FIG. 4. For this purpose the upper triangular strengthening plates 45 are bored so that a pin passing therethrough may also pass through an opening of a fitting at the upper end of the beam 8, and the lower end of the beam 8 is connected with the pin which passes through the openings 23, this latter pin passing through an opening in a fitting at the lower end of the beam 8 which may be in the form of a pair of oppositely threaded screw members interconnected with an oppositely threaded sleeve so as to provide a turnbuckle arrangement in the manner described above. It is not essential to provide triangular plates with openings, since it is possible to connect the upper end of the tie beam 8 to the first of the openings 42 of the upper extension beam 25, and the tie beam 8 will in this event also stiffen the extension unit.

The plates 46 which are welded to the upper and lower ends of the channel beams 44 of the transverse beam 27 of the extension unit 28 are formed with central bores passing therethrough, respectively, and these bores slidably receive sleeves which are fixed coaxially to a pair of nuts 47. The right ends of the sleeve 48, as viewed in FIG. 9, pass through openings formed in a pair of plates 49 also welded to the channel beams 44 adjacent their upper and lower ends but located between these beams, as is apparent from FIG. 10. Thus, the sleeves 48 are slidable in the openings of the plates 46 and 49. The nuts 47 are larger than the openings of the plates 46 through which the sleeves 48 pass so that the nuts 47 cannot move to the right beyond the positions shown in FIGS. 9 and 10. With this arrangement the sleeves 48 are easily shiftable and turnable together with the nuts 47 with respect to plates 46 and 49. By arranging a pair of spaced plates 46 and 49 to support each of these sleeves 48, moments which tend to tilt the sleeves act through these plates on the beams so that the beams will absorb these forces. Any suitable pins or the like may be provided passing through suitable openings for preventing the sleeves 48 from falling from the plates 46 and 49 while rendering the latter easily removable.

The screw members 50 threadedly pass through the nuts 47 freely along the interior of the sleeves 48, and at their left free ends the screws 50 are fixed to the plates 51 which directly engage the surface to be supported in the case of FIGS. 6–8. The composite beams 25 and 26 have longitudinal axes 52, and the axes of the screws 50 are coincident with the axes 52, so that when the truss extends vertically as shown in FIGS. 6–8 the moment tending to tilt the truss along its side portions is at a minimum. Also with this arrangement bending moments acting on the transverse beam 27 are maintained at a minimum, so that the beam 27 need not be particularly strong. If, however, an arrangement as shown in FIG. 6 where a single central load acts on the beam 27 is provided, the beam 27 must be made much stronger so as to resist the bending forces, and in this event only a single screw spindle may be connected with a single portion of the transverse beam 27.

It will be understood that each of the elements described above, or two or more together, may also find a useful application in other types of trusses differing from the types described above.

While the invention has been illustrated and described as embodied in adjustable trusses, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. For use in an adjustable truss, an end unit comprising a transverse end beam and a pair of longitudinal beams respectively fixed to opposite ends of said transverse end beam and extending perpendicularly in only one direction therefrom, said longitudinal beams being of different lengths with the longer of said beams having a length equal to the entire length of said unit and said end unit having a length equal to that of additional units of the truss, said longer beam being twice as long as the shorter of said longitudinal beams; and a pair of oppositely inclined tie beams fixed to a free end of said shorter beam distant from said transverse beam and respectively fixed to the opposite ends of said longer longitudinal beam, each of said longitudinal beams having a pair of opposed side walls defining a space between themselves; an extension beam extending into said space of one of said longitudinal beams and being longitudinally shiftable therein; and means cooperating with said extension beam and said one longitudinal beam for adjustably connecting said extension beam and said one longitudinal beam to each other over a range equal to the length of said shorter longitudinal beam.

2. For use in an adjustable truss, an end unit comprising a transverse end beam and a pair of longitudinal beams respectively fixed to opposite ends of said transverse end beam and extending perpendicularly in only one direction therefrom, said longitudinal beams being of different lengths with the longer of said beams having a length equal to the entire length of said unit and said end unit having a length equal to that of additional units of the truss, said longer beam being twice as long as the shorter of said longitudinal beams; a pair of oppositely inclined tie beams fixed to a free end of said shorter beam distant from said transverse beam and respectively fixed to the opposite ends of said longer longitudinal beam, each of said longitudinal beams having a pair of opposed side walls defining a space between themselves; an extension beam located in the space of the longer of said longitudinal beams and fixed thereto at the junction between said longer longitudinal beam and transverse beam, said extension beam extending from said transverse beam in a direction opposite to said longer longitudinal beam and forming an extension of the latter; an inclined tie beam connected to said extension beam at a part thereof distant from said transverse beam and connected to said transverse beam at the junction of the latter with said shorter longitudinal beam; and means operatively connected with the latter tie beam for adjusting the length thereof.

3. For use in an adjustable truss, an end unit comprising a transverse end beam and a pair of longitudinal beams respectively fixed to opposite ends of said transverse end beam and extending perpendicularly in only one direction therefrom, said longitudinal beams being of different lengths with the longer of said beams having a length equal to the entire length of said unit and said end unit having a length equal to that of additional units of the truss, said longer beam being twice as long as the shorter of said longitudinal beams; a pair of oppositely inclined tie beams fixed to a free end of said shorter beam distant from said transverse beam and respectively fixed to the opposite ends of said longer longitudinal beam, each of said longitudinal beams having a pair of opposed side walls defining a space between themselves; a pair of extension beams respectively located in said spaces of said longitudinal beams and extending beyond the latter and beyond said transverse beam in a direction opposite from said longitudinal beams, said extension beams forming extensions of said longitudinal beams; means cooperating with said extension beams and longitudinal beams for adjustably connecting said extension beams respectively to said longitudinal beams over a range equal to one half the length of said longer longitudinal beam; and an additional transverse beam extending between and fixed to free ends of said extension beams located distant from said first-mentioned transverse beam.

4. For use in an adjustable truss, an end unit comprising a transverse end beam and a pair of longitudinal beams respectively fixed to opposite ends of said transverse end beam and extending perpendicularly in only one direction therefrom, said longitudinal beams being of different lengths with the longer of said beams having a length equal to the entire length of said unit and said end unit having a length equal to that of additional units of the truss, said longer beam being twice as long as the shorter of said longitudinal beams; a pair of oppositely inclined tie beams fixed to a free end of said shorter beam distant from said transverse beam and respectively fixed to the opposite ends of said longer longitudinal beam, each of said longitudinal beams having a pair of opposed side walls defining a space between themselves; a pair of extension beams respectively located in said spaces of said longitudinal beams and extending beyond the latter and beyond said transverse beam in a direction opposite from said longitudinal beams, said extension beams forming extensions of said longitudinal beams; means cooperating with said extension beams and longitudinal beams for adjustably connecting said extension beams respectively to said longitudinal beams over a range equal to one half the length of said longer longitudinal beam; an additional transverse beam extending between and fixed to free ends of said extension beams located distant from said first-mentioned transverse beam; and a pair of screw means threadedly connected with said extension beams at said free ends thereof and respectively having axes substantially coinciding with the axes of said extension beams, said pair of screw means extending adjustably beyond the free ends of said extension beams.

5. For use in an adjustable truss, an end unit comprising a transverse end beam and a pair of longitudinal beams respectively fixed to opposite ends of said transverse end beam and extending perpendicularly in only one direction therefrom, said longitudinal beams being of different lengths with the longer of said beams having a length equal to the entire length of said unit and said end unit having a length equal to that of additional units of the truss, said longer beam being twice as long as the shorter of said longitudinal beams; a pair of oppositely inclined tie beams fixed to a free end of said shorter beam distant from said transverse beam and respectively fixed to the opposite ends of said longer longitudinal beam, each of said longitudinal beams having a pair of opposed side walls defining a space between themselves; a pair of extension beams respectively located in said spaces of said longitudinal beams and extending beyond the latter and beyond said transverse beam in a direction opposite from said longitudinal beams, said extension beams forming extensions of said longitudinal beams; means cooperating with said extension beams and longitudinal beams for adjustably connecting said extension beams respectively to said longitudinal beams over a range equal to one half the length of said longer longitudinal beam; an additional transverse beam extending between and fixed to free ends of said extension beams located distant from said first-mentioned transverse beam; and a pair of screw means threadedly connected with said extension beams at said free ends thereof and respectively having axes substantially coinciding with the axes of said extension beams, said pair of screw means extending adjustably beyond the free ends of said extension beams, said means for adjustably connecting said extension beams to said longitudinal beams including a plurality of openings spaced from each other by a predetermined distance so that a selected one of said openings may be positioned at the junction of said longitudinal and first-mentioned transverse beams to receive a connecting pin, and each of said screw means being adjustable over a range at least equal to said predetermined distance between said openings.

6. For use in an adjustable truss, an end unit comprising a transverse end beam and a pair of longitudinal beams respectively fixed to opposite ends of said transverse end beam and extending perpendicularly in only one direction therefrom, said longitudinal beams being of different lengths with the longer of said beams having a length equal to the entire length of said unit and said end unit having a length equal to that of additional units of the truss, said longer beam being twice as long as the shorter of said longitudinal beams; a pair of oppositely inclined tie beams fixed to a free end of said shorter beam distant from said transverse beam and respectively fixed to the opposite ends of said longer longitudinal beam, each of said longitudinal beams having a pair of opposed side walls defining a space between themselves; a pair of extension beams respectively located in said spaces of said longitudinal beams and extending beyond the latter and beyond said transverse beam in a direction opposite from said longitudinal beams, said extension beams forming extensions of said longitudinal beams; means cooperating with said extension beams and longitudinal beams for adjustably connecting said extension beams respectively to said longitudinal beams over a range equal to one half the length of said longer longitudinal beam; an additional transverse beam extending between and fixed to free ends of said extension beams located distant from said first-mentioned transverse beam; and a pair of screw means threadedly connected with said extension beams at said free ends thereof and respectively having axes substantially coinciding with the axes of said extension beams, said pair of screw means extending adjustably beyond the free ends of said extension beams, each of said adjustable screw means including a nut and a screw extending threadedly through said nut and means releasably connecting said nuts with said free ends of said extension beams.

References Cited in the file of this patent

UNITED STATES PATENTS

| | | |
|---|---|---|
| 1,859,136 | Goodrich | May 17, 1932 |
| 1,964,208 | Leland | June 26, 1934 |
| 2,510,767 | Vocisano | June 6, 1950 |
| 2,909,253 | Hinze | Oct. 20, 1959 |
| 2,965,951 | Novak et al. | Dec. 27, 1960 |